United States Patent
Hori et al.

(10) Patent No.: US 11,215,474 B2
(45) Date of Patent: Jan. 4, 2022

(54) VEHICLE DRIVING ASSIST APPARATUS AND VEHICLE DRIVING ASSIST METHOD

(71) Applicant: Toyota Jidosha Kabushiki Kaisha, Toyota (JP)

(72) Inventors: Takashige Hori, Aisai (JP); Makoto Akahane, Nagoya (JP); Ken Ishikawa, Nagakute (JP); Masatoshi Takahara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 16/251,426

(22) Filed: Jan. 18, 2019

(65) Prior Publication Data
US 2019/0226869 A1 Jul. 25, 2019

(30) Foreign Application Priority Data
Jan. 22, 2018 (JP) .............................. JP2018-007932

(51) Int. Cl.
*G01C 21/36* (2006.01)
*G01C 21/34* (2006.01)

(52) U.S. Cl.
CPC ..... *G01C 21/3697* (2013.01); *G01C 21/3461* (2013.01)

(58) Field of Classification Search
CPC .......................... G01C 21/3697; G01C 21/3461
See application file for complete search history.

(56) References Cited

U.S. PATENT DOCUMENTS

| | | | | |
|---|---|---|---|---|
| 9,188,985 B1* | 11/2015 | Hobbs | ................ | G01C 21/3626 |
| 9,625,266 B1* | 4/2017 | Chintakindi | ....... | G01C 21/3484 |
| 9,672,738 B1* | 6/2017 | Ferguson | ............. | G08G 1/0129 |
| 10,222,228 B1* | 3/2019 | Chan | .................. | G01C 21/3691 |
| 10,417,914 B1* | 9/2019 | Vose | ...................... | G08G 1/123 |
| 2008/0004802 A1* | 1/2008 | Horvitz | ............. | G01C 21/3415 |
| | | | | 701/533 |
| 2010/0211304 A1* | 8/2010 | Hwang | ............. | G01C 21/3484 |
| | | | | 701/532 |

(Continued)

FOREIGN PATENT DOCUMENTS

| | | |
|---|---|---|
| GN | 101297335 A | 10/2008 |
| JP | 06-052489 A | 2/1994 |

(Continued)

*Primary Examiner* — James J Lee
*Assistant Examiner* — Tawri M Matsushige
(74) *Attorney, Agent, or Firm* — Dinsmore & Shohl LLP

(57) ABSTRACT

A vehicle driving assist apparatus includes a searching unit and a guidance unit. The searching unit is configured to search for a travel route based on a search instruction. The travel route is a route along which a vehicle travels to a destination. The guidance unit is configured as follows: when the searching unit finds a plurality of travel routes and the plurality of travel routes includes two or more travel routes each including a merging point where two or more roads meet, the guidance unit provides a driver with information about a travel route that is included in the plurality of travel routes and that includes the merging point before which there is a road that is included in the two or more roads and that allows vehicles to easily accelerate, in preference to the rest of the travel routes.

8 Claims, 3 Drawing Sheets

(56) References Cited

U.S. PATENT DOCUMENTS

| | | | | |
|---|---|---|---|---|
| 2011/0224898 A1* | 9/2011 | Scofield | ................ | G08G 1/052 |
| | | | | 701/532 |
| 2011/0276265 A1* | 11/2011 | Husain | ............... | G01C 21/3461 |
| | | | | 701/533 |
| 2012/0185118 A1* | 7/2012 | Tate, Jr. | ............. | G01C 21/3469 |
| | | | | 701/22 |
| 2013/0046559 A1* | 2/2013 | Coleman | ................ | G06Q 40/08 |
| | | | | 705/4 |
| 2013/0304347 A1* | 11/2013 | Davidson | ............... | G08G 1/052 |
| | | | | 701/99 |
| 2015/0266455 A1* | 9/2015 | Wilson | ................. | B60W 30/10 |
| | | | | 701/93 |
| 2017/0236411 A1* | 8/2017 | Sumers | ................ | G06K 9/6293 |
| | | | | 701/117 |
| 2018/0348002 A1* | 12/2018 | Aggarwal | .......... | G01C 21/3461 |
| 2020/0079377 A1* | 3/2020 | Yashiro | ................ | B60W 10/04 |

FOREIGN PATENT DOCUMENTS

| | | |
|---|---|---|
| JP | 2007-149054 A | 6/2007 |
| WO | 2007049110 A1 | 5/2008 |

\* cited by examiner

VEHICLE DRIVING ASSIST APPARATUS AND VEHICLE DRIVING ASSIST METHOD

CROSS-REFERENCE TO RELATED APPLICATION

This application claims priority to Japanese Patent Application No. 2018-007932 filed on Jan. 22, 2018, incorporated herein by reference in its entirety.

BACKGROUND

1. Technical Field

The present disclosure relates to a vehicle driving assist apparatus and relates also to a vehicle driving assist method.

2. Description of Related Art

Japanese Unexamined Patent Application Publication No. 06-052489 (JP 06-052489 A) describes a road sign system. The road sign system indicates, at a main road, the presence of a merging vehicle coming from a merging road, thereby giving a warning about the presence of the merging vehicle to a driver of a vehicle traveling on the main road. In this way, the road sign system contributes to reduction in vehicle accidents at a merging point and facilitation of smooth merging of vehicles at the merging point.

SUMMARY

With the road sign system described in JP 06-052489 A, it is possible to give a warning to a driver of a vehicle traveling on a main road; however, it is not possible to give a warning to a driver of a vehicle traveling on a merging road. Thus, a driver of a vehicle that is going to enter the main road from the merging road needs to confirm the safety by himself/herself. In view of this, there is still room for improvement in facilitation of smoothly merging of vehicles.

The present disclosure provides a vehicle driving assist apparatus and a vehicle driving assist method, each of which provides useful guidance to a driver.

A first aspect of the disclosure relates to a vehicle driving assist apparatus. The vehicle driving assist apparatus includes a searching unit and a guidance unit. The searching unit is configured to search for a travel route based on a search instruction. The travel route is a route along which a vehicle travels to a destination. The guidance unit is configured as follows: when the searching unit finds a plurality of travel routes and the plurality of travel routes includes two or more travel routes each including a merging point where two or more roads meet, the guidance unit provides a driver with information about a travel route that is included in the plurality of travel routes and that includes the merging point before which there is a road that is included in the two or more roads and that allows vehicles to easily accelerate, in preference to the rest of the travel routes.

The vehicle driving assist apparatus according to the first aspect may further include a determining unit configured to determine whether each of the two or more roads located before the merging point is the road that allows vehicles to easily accelerate, based on vehicle information collected from a plurality of vehicles. The vehicle information includes vehicle location information and vehicle status information. Further, the guidance unit may be configured to provide information about the travel route including the merging point before which there is the road determined, by the determining unit, to be the road that allows vehicles to easily accelerate, in preference to the rest of the travel routes.

In the first aspect, the vehicle status information may include at least vehicle speed information and vehicle accelerator operation amount information. Further, the determining unit may be configured to calculate a correlation between an accelerator operation amount and an acceleration of each of a plurality of vehicles that travel on the two or more roads located before the merging point, based on the vehicle information. In addition, the determining unit may be configured to determine that a road which is included in the two or more roads and on which there are more vehicles that achieve an acceleration degree higher than a predetermined reference than on the rest of the roads is the road that allows vehicles to easily accelerate. The acceleration degree is a degree of the acceleration with respect to the accelerator operation amount.

The vehicle driving assist apparatus according to the first aspect may further include a vehicle determining unit configured to determine a vehicle that requires a longer time to travel through a road located before a merging point than other vehicles, based on the vehicle information. Further, the guidance unit may be configured to provide a driver of the vehicle determined by the vehicle determining unit with information about the travel route including the merging point before which there is the road that allows vehicles to easily accelerate, in preference to the rest of the travel routes.

In the first aspect, the guidance unit may be configured to provide the driver with information about a travel route that is included in the plurality of travel routes and that includes the merging point before which there is a road that is included in the two or more roads and that has a score highest among the two or more roads, in preference to the rest of the travel routes. The score indicates the ease with which vehicles accelerate.

In the first aspect, the search instruction may be issued by the driver of the vehicle.

In the first aspect, the road that allows vehicles to easily accelerate may be a road that allows vehicles to accelerate with greater ease than a predetermined reference.

A second aspect of the disclosure relates to a vehicle driving assist method. The vehicle driving assist method includes: searching for a travel route based on a search instruction, the travel route being a route along which a vehicle travels to a destination; and when a plurality of travel routes is found through a search and the plurality of travel routes includes two or more travel routes each including a merging point where two or more roads meet, providing a driver with information about a travel route that is included in the plurality of travel routes and that includes the merging point before which there is a road that is included in the two or more roads and that allows vehicles to easily accelerate, in preference to the rest of the travel routes.

According to the above aspects of the disclosure, it is possible to provide a vehicle driving assist apparatus and a vehicle driving assist method, each of which provides useful guidance to a driver.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION

Figure 1:
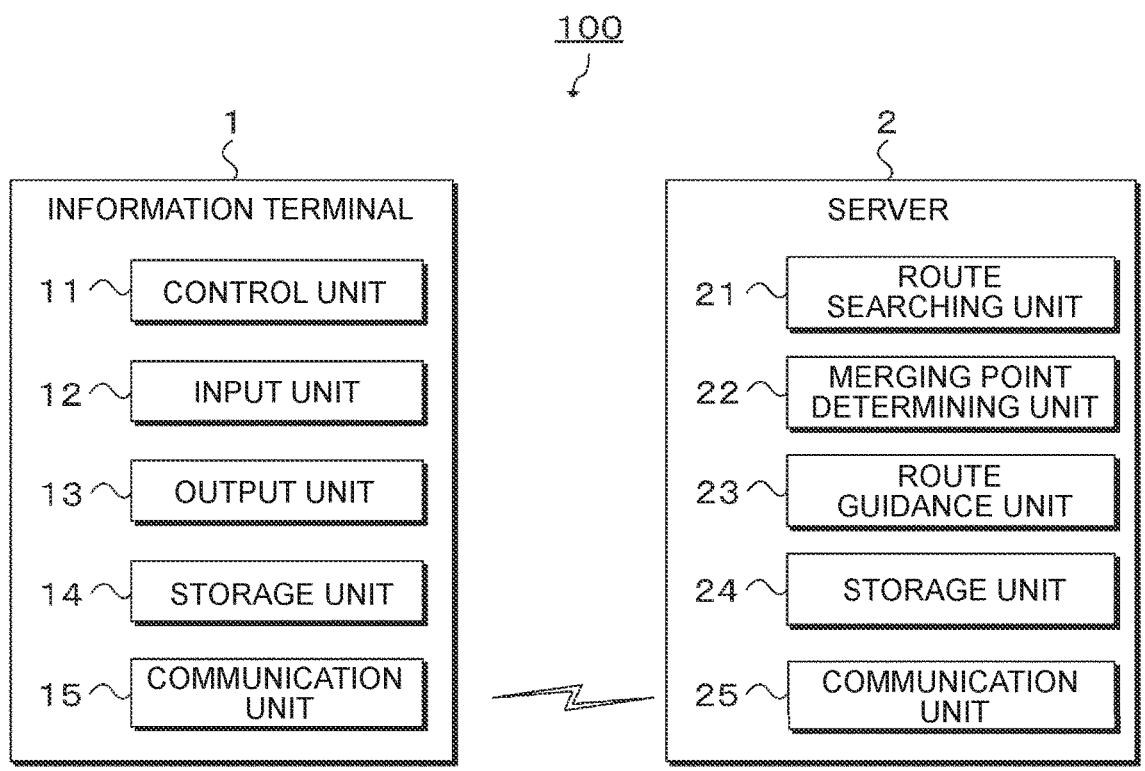
FIG. 1 is a block diagram illustrating the configuration of a driving assist system according to an embodiment.

Hereinafter, example embodiments will be described with reference to the accompanying drawings. Note that, the same reference signs denote the same or similar components in the drawings.

The configuration of a driving assist system 100 according to an embodiment will be described with reference to FIG. 1. The driving assist system 100 includes, for example, an information terminal 1 to be used by a user and a server 2 disposed in, for example, a data center. The information terminal 1 and the server 2 are configured to communicate with each other via, for example, a network including a wireless network.

The information terminal 1 illustrated in FIG. 1 is, for example, a terminal device, such as a car navigation device, an on-board device with a navigation function, or a smart phone. The information terminal 1 includes, fore example, a control unit 11, an input unit 12, an output unit 13, a storage unit 14, and a communication unit 15, as functional elements. The information terminal 1 includes, for example, a controller, an operating device, a display, a speaker, a storage device, and a communication device, as physical elements. The controller includes a central processing unit (CPU) and a memory. When the CPU executes predetermined programs stored in the memory, the functions of the control unit 11, the input unit 12, the output unit 3, the storage unit 14, and the communication unit 15 are implemented.

The server 2 includes, for example, a route searching unit 21, a merging point determining unit 22, a route guidance unit 23, a storage unit 24, and a communication unit 25, as functional elements. The server 2 includes, for example, a controller, a storage device, and a communication device, as physical elements. The controller includes a CPU and a memory. When the CPU executes predetermined programs stored in the memory, the functions of the route searching unit 21, the merging point determining unit 22, the route guidance unit 23, the storage unit 24, and the communication unit 25 are implemented. Of these functions, the functions of the route searching unit 21, the merging point determining unit 22, and the route guidance unit 23 will be described below in detail.

The route searching unit 21 searches for a travel route based on, for example, a search Instruction issued in response to a driver's instructing operation. The travel route is a route along which a vehicle travels to a destination. The function of a commonly-used car navigation may be used as the function of searching for a travel route based on a search instruction.

The merging point determining unit 22 determines whether a road located before a merging point is a road that allows vehicles to easily accelerate, based on vehicle information collected from a plurality of vehicles. A merging point is a point where two or more roads meet. A merging point is determined based on, for example, map information.

A road that allows vehicles to easily accelerate is, for example, a road that allows vehicles to accelerate with ease greater than a predetermined reference.

Vehicle information collected from the plurality of vehicles is stored in the storage device. Vehicle information includes, for example, vehicle location information, vehicle status information, vehicle attribute information, and time at which data is collected. Vehicle status information includes, for example, vehicle speed information and vehicle accelerator operation amount information.

Figure 2:
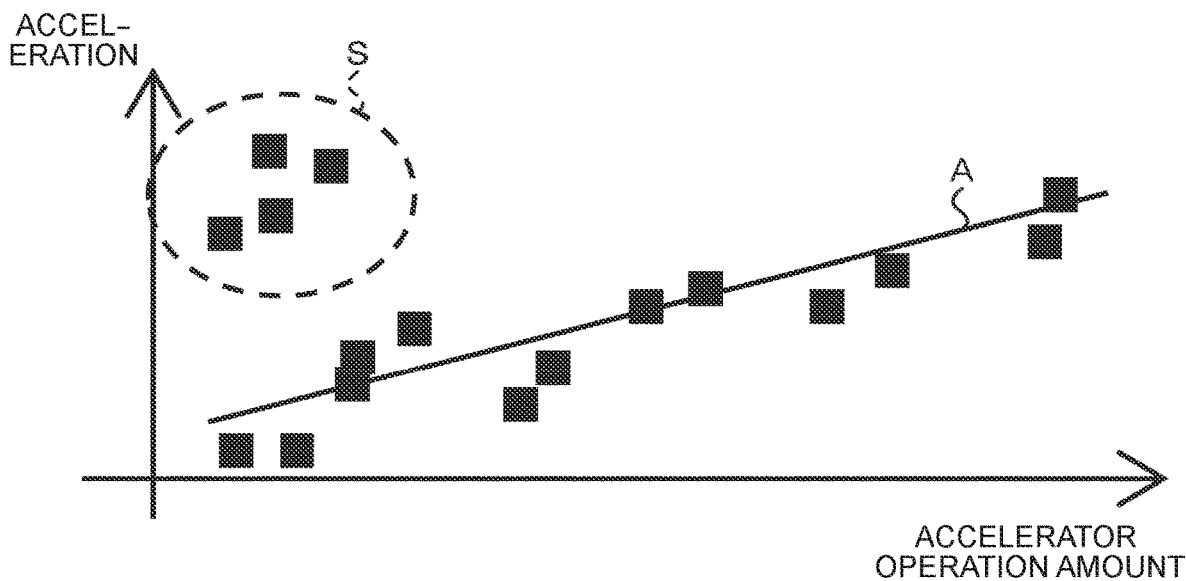
FIG. 2 is a graph illustrating a correlation between an accelerator operation amount and an acceleration of each of a plurality of vehicles that travel on roads located before a merging point.

A procedure of determining a road that allows vehicles to easily accelerate will be described in detail below with reference to FIG. 2.

Initially, the merging point determining unit 22 calculates a correlation between an accelerator operation amount and an acceleration of each of a plurality of vehicles that travel on roads located before a merging point, based on vehicle information collected from the plurality of vehicles. Thus, a graph A is obtained. The graph A illustrates an average correlation between the acceleration operation amounts and the accelerations of the plurality of vehicles that travel on the roads located before the merging point.

Subsequently, the merging point determining unit 22 detects a data group (or datum) S at which the degree of acceleration with respect to the accelerator operation amount is higher than the graph A. The merging point determining unit 22 determines that a location corresponding to the data group S is a road that allows vehicles to easily accelerate.

Examples of roads that allow vehicles to easily accelerate include a downhill, a road having a relatively long linear distance, and a road on which vehicles are easily influenced by tail wind.

Description will be provided again with reference to FIG. 1. When a plurality of travel routes found by the route searching unit 21 includes two or more travel routes each including a merging point, the route guidance unit 23 provides a driver with information about a travel route including a merging point before which there is a road determined, by the merging point determining unit 22, to be a road that allows vehicles to easily accelerate, in preference to the rest of the travel routes.

When there are two or more roads that allow vehicles to easily accelerate, the route guidance unit 23 may provide a driver with information about a travel route including a merging point before which there is a road having a score higher than that of the rest of the roads, in preference to the rest of the travel routes. The score indicates the ease with which vehicles can accelerate. The score indicating the ease with which vehicles can accelerate may be calculated based on, for example, a deviation from the graph A illustrated in FIG. 2, when the merging point determining unit 22 determines a road that allows vehicles to easily accelerate.

The route guidance unit 23 may provide travel route guidance in accordance with a predetermined rule when the travel routes found by the route searching unit 21 include only one travel route including a merging point or does not include any travel route including a merging point. Examples of the predetermined rule include a rule that travel route guidance is provided in a priority mode that is specified by a driver from among a plurality of priority modes set in advance, and a rule that route guidance is provided in a specific priority mode set in advance. Examples of the priority modes include a recommended mode, an expressway priority mode, an ordinary road priority mode, a distance priority mode, and a time priority mode.

Travel route guidance is provided by, for example, causing the display of the information terminal 1 to display a travel route.

Figure 3:
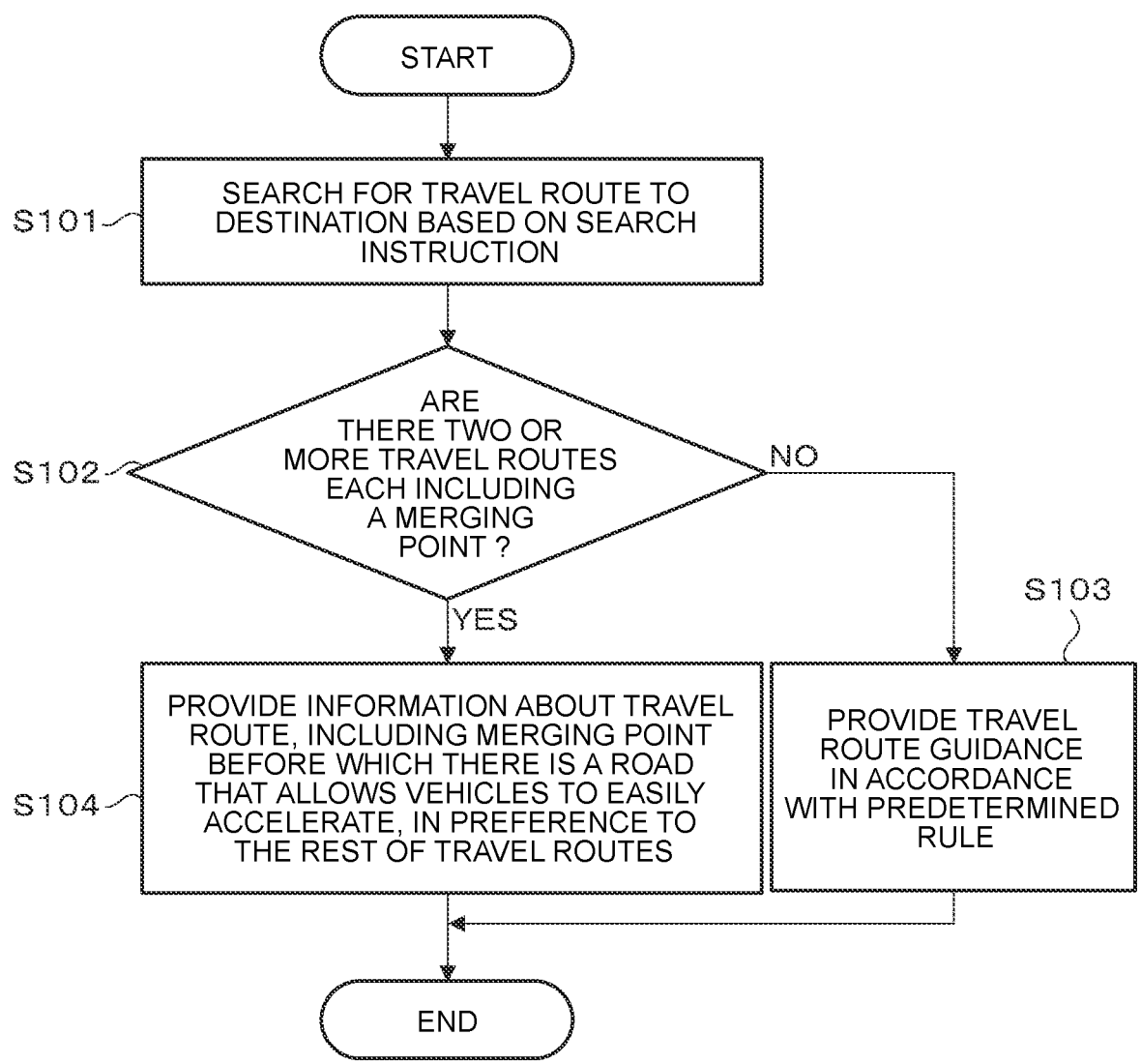
FIG. 3 is a flowchart illustrating an operation of the driving assist system according to the embodiment.

An example of the operation of the driving assist system 100 in the present embodiment will be described with reference to FIG. 3.

Initially, the route searching unit 21 searches for a travel route to a destination based on a driver's search instruction (step S101).

Subsequently, the route guidance unit 23 determines whether the travel routes found in step S101 include a plurality of travel routes each including a merging point (step S102). When the route guidance unit 23 makes a negative determination in step S102 (NO in step S102), the route guidance unit 23 provides travel route guidance in accordance with the predetermined rule (step S103). After that, the operation ends.

On the other hand, when the route guidance unit 23 determines in step S102 that the travel routes found in step S101 include two or more travel routes each including a merging point (YES in step S102), the route guidance unit 23 provides a driver with information about a travel route including a merging point before which there is a road that allows vehicles to easily accelerate, in preference to the rest of the travel routes (step S104). After that, the operation ends.

As described above, with the driving assist system 100 according to the present embodiment, it is possible to search for a travel route to a destination based on a driver's search instruction. Further, when the travel routes found through the search include two or more travel routes each including a merging point, it is possible to provide a driver with information about a travel route including a merging point before which there is a road that allows vehicles to easily accelerate, in preference to the rest of the travel routes.

With the driving assist system 100 according to the present embodiment, it is possible to determine whether a road located before a merging point is a road that allows vehicles to easily accelerate, based on vehicle information collected from a plurality of vehicles, and then provide a driver with information about a travel route including a merging point before which there is the road determined to be a road that allows vehicles to easily accelerate, in preference to the rest of the travel routes.

With the driving assist system 100 according to the present embodiment, it is possible to calculate a correlation between an accelerator operation amount and an acceleration of each of a plurality of vehicles that travel on roads located before a merging point, based on vehicle information collected from the plurality of vehicles. Then, a road on which there are more vehicles that achieve an acceleration degree higher than a predetermined reference than on the rest of the roads is determined to be a road that allows vehicles to easily accelerate. The acceleration degree is a degree of the acceleration with respect to the accelerator operation amount. Then, it is possible to provide a driver with information about a travel route including a merging point before which there is the road determined to be a road that allows vehicles to easily accelerate, in preference to the rest of the travel routes.

In view of this, with the driving assist system 100 according to the present embodiment, it is possible to provide useful guidance to a driver.

Alternative Embodiments

The disclosure is not limited to the above-described embodiment. The disclosure may be implemented in various other embodiments without departing from the scope of the appended claims. Therefore, the above-described embodiment is only illustrative in all respects, and should not be interpreted as restrictive. For example, the order in which the above-described processing steps are executed may be changed or may be executed in parallel, as long as no technical contradiction arises.

In the above-described embodiment, the server 2 includes the route searching unit 21, the merging point determining unit 22, and the route guidance unit 23; however, the disclosure is not limited to this configuration. Alternatively, the information terminal 1 may include at least one of or all of the functions of the route searching unit 21, the merging point determining unit 22, and the route guidance unit 23. Each of the information terminal 1 and the server 2 may be a vehicle driving assist apparatus.

The components of the information terminal 1 and the server 2 are not limited to the above-described components in the foregoing embodiments. Another component may be added as needed.

Figure 4:
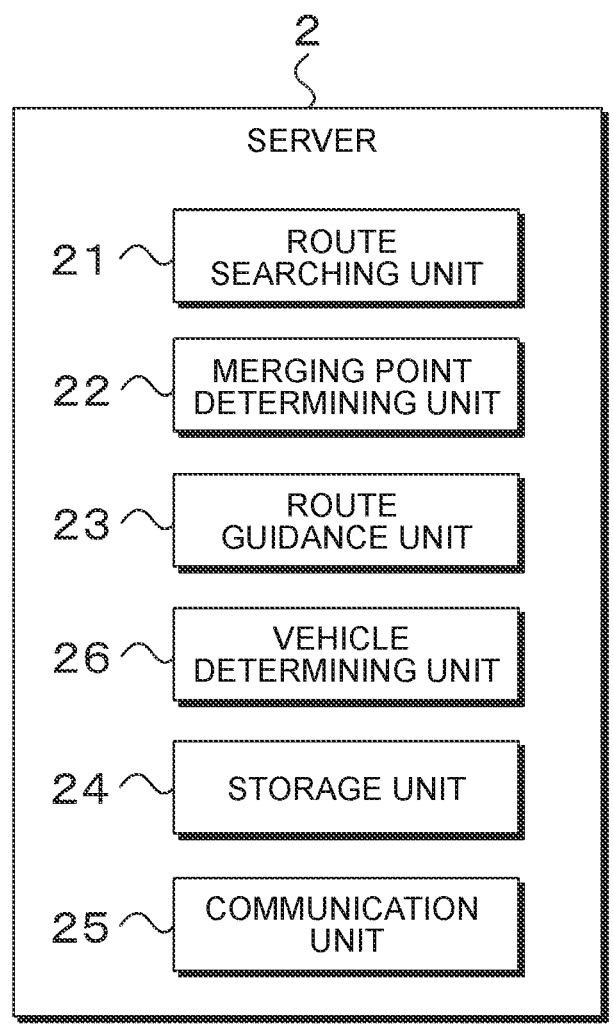
FIG. 4 is a block diagram illustrating the configuration of a server according to an alternative embodiment.

For example, as illustrated in FIG. 4, the server 2 may further include a vehicle determining unit 26. The vehicle determining unit 26 determines a vehicle that requires a longer time to travel through a road located before a merging point than other vehicles, based on vehicle information. In this alternative embodiment, regardless of whether a priority mode has been set, the route guidance unit 23 may provide a driver of a vehicle determined by the vehicle determining unit 26, with information about a travel route including a merging point before which there is a road that allows vehicles to easily accelerate, in preference to the rest of the travel routes.

Thus, it is possible to provide a driver who is not good at merging with other traffic, with information about a route including a merging point before which there is a road that allows vehicles to easily accelerate.

What is claimed is:
1. A vehicle driving assist apparatus comprising:
a controller comprising a CPU and a memory, wherein the controller is configured to:
search for a travel route based on a search instruction, the travel route being a route along which a vehicle travels to a destination, and
when the controller finds a plurality of travel routes and the plurality of travel routes includes two or more travel routes each including a merging point where two or more roads meet, calculate a correlation between an accelerator operation amount and an acceleration of each of a plurality of vehicles that travel on roads located before the merging point;
determine an average correlation between the accelerator operation amounts and the accelerations of the plurality of vehicles that travel on the roads located before the merging point;
detect a data group at which the correlation between the accelerator operation amounts and the accelerations are greater than the average correlation;
determine a location corresponding to the data group;
determine a travel route containing the determined location among the plurality of travel routes that includes the merging point before which there is a road that is included in the two or more roads as a travel route that allows vehicles to easily accelerate, in preference to the rest of the travel routes; and
provide a driver with information about the determined travel route.

2. The vehicle driving assist apparatus according to claim 1, wherein the controller is further configured to:
  determine whether each of the two or more roads located before the merging point is the road that allows vehicles to easily accelerate, based on vehicle information collected from a plurality of vehicles, the vehicle information including vehicle location information and vehicle status information, and
  provide information about the travel route including the merging point before which there is the road determined, by the controller, to be the road that allows vehicles to easily accelerate, in preference to the rest of the travel routes.

3. The vehicle driving assist apparatus according to claim 2, wherein:
  the vehicle status information includes at least vehicle speed information and vehicle accelerator operation amount information;
  the controller is configured to calculate a correlation between an accelerator operation amount and an acceleration of each of a plurality of vehicles that travel on the two or more roads located before the merging point, based on the vehicle information; and
  the controller is configured to determine that a road which is included in the two or more roads and on which there are more vehicles that achieve an acceleration degree higher than a predetermined reference than on the rest of the roads is the road that allows vehicles to easily accelerate, the acceleration degree being a degree of the acceleration with respect to the accelerator operation amount.

4. The vehicle driving assist apparatus according to claim 2, wherein the controller is further configured to:
  determine a vehicle that requires a longer time to travel through a road located before a merging point than other vehicles, based on the vehicle information, and
  provide a driver of the vehicle determined by the controller with information about the travel route including the merging point before which there is the road that allows vehicles to easily accelerate, in preference to the rest of the travel routes.

5. The vehicle driving assist apparatus according to claim 1, wherein the controller is configured to provide the driver with information about a travel route that is included in the plurality of travel routes and that includes the merging point before which there is a road that is included in the two or more roads and that has a score highest among the two or more roads, in preference to the rest of the travel routes, the score being a score indicating ease with which vehicles accelerate.

6. The vehicle driving assist apparatus according to claim 1, wherein the search instruction is issued by the driver of the vehicle.

7. The vehicle driving assist apparatus according to claim 1, wherein the road that allows vehicles to easily accelerate is a road that allows vehicles to accelerate at ease greater than a predetermined reference.

8. A vehicle driving assist method comprising:
  searching for a travel route based on a search instruction, the travel route being a route along which a vehicle travels to a destination;
  when a plurality of travel routes is found through a search and the plurality of travel routes includes two or more travel routes each including a merging point where two or more roads meet, calculating a correlation between an accelerator operation amount and an acceleration of each of a plurality of vehicles that travel on roads located before the merging point;
  determining an average correlation between the accelerator operation amounts and the accelerations of the plurality of vehicles that travel on the roads located before the merging point;
  detecting a data group at which the correlation between the accelerator operation amounts and the accelerations are greater than the average correlation;
  determining a location corresponding to the data group;
  determining a travel route containing the determined location among the plurality of travel routes that includes the merging point before which there is a road that is included in the two or more roads as a travel route that allows vehicles to easily accelerate, in preference to the rest of the travel routes; and
  providing a driver with information about the determined travel route.

* * * * *